US012685254B2

(12) United States Patent
Carpenedo

(10) Patent No.: US 12,685,254 B2
(45) Date of Patent: Jul. 21, 2026

(54) MISALIGNED BASE CUTTER DISCS

(71) Applicant: AGCO DO BRASIL SOLUÕES AGRÍCOLAS LTDA, Ribeireo Preto (BR)

(72) Inventor: Marcelo Carpenedo, Sapucaia do Sul (RS)

(73) Assignee: AGCO do Brasil Solučöes Agricolas Ltda., Ribeireo Preto (BR)

( * ) Notice: Subject to any disclaimer, the term of this patent is extended or adjusted under 35 U.S.C. 154(b) by 480 days.

(21) Appl. No.: 18/257,871

(22) PCT Filed: Oct. 18, 2021

(86) PCT No.: PCT/IB2021/059568
§ 371 (c)(1),
(2) Date: Jun. 15, 2023

(87) PCT Pub. No.: WO2022/136953
PCT Pub. Date: Jun. 30, 2022

(65) Prior Publication Data
US 2024/0090372 A1 Mar. 21, 2024

(30) Foreign Application Priority Data
Dec. 21, 2020 (GB) ................................. GB2020256

(51) Int. Cl.
*A01D 45/10* (2006.01)
*A01D 34/66* (2006.01)

(52) U.S. Cl.
CPC ........... *A01D 34/661* (2013.01); *A01D 45/10* (2013.01)

(58) Field of Classification Search
CPC .... A01D 34/66; A01D 34/661; A01D 34/662; A01D 34/664; A01D 34/665; A01D 34/863; A01D 34/866; A01D 45/10
See application file for complete search history.

(56) References Cited

U.S. PATENT DOCUMENTS

| | | | | |
|---|---|---|---|---|
| 1,406,093 A | * | 2/1922 | Scranton | ................ A01D 45/10 56/14.7 |
| 1,459,247 A | * | 6/1923 | Vilar Y Pazos | ....... A01D 45/10 56/13.9 |

(Continued)

FOREIGN PATENT DOCUMENTS

| | | | | |
|---|---|---|---|---|
| CN | 107318368 A | * | 11/2017 | ............. A01D 45/10 |
| DE | 2011269 A1 | | 9/1971 | |

(Continued)

OTHER PUBLICATIONS

European Patent Office, International Search Report related to International Patent Application No. PCT/IB2021/059568, mail date Jan. 25, 2022, 15 pages.

*Primary Examiner* — Adam J Behrens

(57) ABSTRACT

In one embodiment, a base cutter system, comprising: a first cutter shaft assembly; a second cutter shaft assembly; first and second brackets coupled to the first and second cutter shaft assemblies, respectively; first and second frame portions, the first cutter shaft assembly coupled to the first frame portion via the first bracket and the second cutter shaft assembly coupled to the second frame portion via the second bracket, the first and second cutter shaft assemblies adjustable between a laterally aligned arrangement and a laterally misaligned arrangement based on a relative adjustment of the first and second brackets.

19 Claims, 12 Drawing Sheets

(56)                    References Cited

U.S. PATENT DOCUMENTS

| | | | | |
|---|---|---|---|---|
| 3,550,360 | A * | 12/1970 | Van Der Lely | A01D 34/66 |
| | | | | 56/6 |
| 4,601,162 | A * | 7/1986 | Wessel | A01D 78/1092 |
| | | | | 56/192 |
| 5,138,819 | A * | 8/1992 | Andre | A01D 75/28 |
| | | | | 56/208 |
| 5,220,773 | A * | 6/1993 | Klaeger | A01D 75/30 |
| | | | | 56/13.6 |
| 10,905,048 | B2 * | 2/2021 | Bertino | A01D 57/22 |
| 11,206,762 | B2 * | 12/2021 | Button | A01D 34/835 |
| 2015/0319922 | A1 * | 11/2015 | Stoffel | A01D 34/81 |
| | | | | 56/14.7 |
| 2023/0284559 | A1 * | 9/2023 | Pereira De Camargo | |
| | | | | A01D 34/24 |

FOREIGN PATENT DOCUMENTS

| | | | | | |
|---|---|---|---|---|---|
| DE | 102008010204 | A1 | 9/2009 | | |
| DE | 102008056046 | A1 * | 5/2010 | | A01D 34/66 |
| EP | 0141974 | A2 * | 5/1985 | | A01D 34/866 |
| KR | 100764605 | B1 * | 10/2007 | | A01D 34/828 |
| WO | WO-2007052324 | A1 * | 5/2007 | | A01D 34/863 |
| WO | WO-2022016250 | A1 * | 1/2022 | | A01D 45/10 |

* cited by examiner

MISALIGNED BASE CUTTER DISCS

CROSS-REFERENCE TO RELATED APPLICATIONS

This application is a national stage application under 35 U.S.C. 371 of International Patent Application No. PCT/IB2021/059568, filed on Oct. 18, 2021, which claims the benefit of U.K. Application No. GB 2020256.0, filed Dec. 21, 2020, both of which are hereby incorporated by reference in their entirety.

TECHNICAL FIELD

The present disclosure is generally related to sugar cane harvesters and, more particularly, base cutters for sugarcane harvesters.

BACKGROUND

Sugarcane harvesters comprise agricultural equipment used to harvest sugarcane crop. In essence, sugarcane harvesters strip off the leaves, cut sugarcane stalks close to the base, and cut the sugarcane into segments or billets. In sugarcane harvesting, the base cutter system is an important system of the machine and is important to the entire sugarcane harvesting process. For instance, the base cutter system has a direct impact on crop health for subsequent harvests. If the base cutters are too aggressive, the entire sugarcane root system may be destroyed. Further, poor performance by the base cutters may lead to poor yields. Mill personnel closely monitor the harvested crop for losses. Also, knived discs, which are often used in today's base cutter system, may pose some challenges to maintenance in view of the quantity of parts involved, and depending on the soil conditions, may require daily maintenance for each day of operation.

To address at least some of these challenges posed by knived discs for some applications, some manufacturers have looked to ways to eliminate or mitigate the aggressive cutting. One solution found in the after-market parts business is in the form of serrated blades, which given the nature of the high frequency cut by many more sharp edges (e.g., like a saw tooth) when compared to knived discs, tend to reduce plant (e.g., root) damage. However, existing serrated blade solutions present their own set of challenges. For instance, unlike knived discs, which have a central area of cutting overlap through the intermeshing of a portion of the disc knives, serrated blades are designed differently such that there is no intended overlap, and hence are not a direct replacement. That is, there is no intermeshing in the serrated blades, which if a direct replacement is attempted, leads to a gap located centrally between the blades and hence loss of harvest yield. To remedy this shortcoming to serrated blade use, some manufacturers offset the height of the serrated blades (e.g., partially stack them at the periphery where they almost meet) relative to each other. However, one shortcoming to this approach is the increased cutting area along the stalk due to the cumulative dimensions of the two, layered serrated blades, in addition to any additional dimensions due to clearances that are intended to avoid disc contact with each other due to deformation.

BRIEF DESCRIPTION OF THE DRAWINGS

Many aspects of certain embodiments of a base cutter system can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
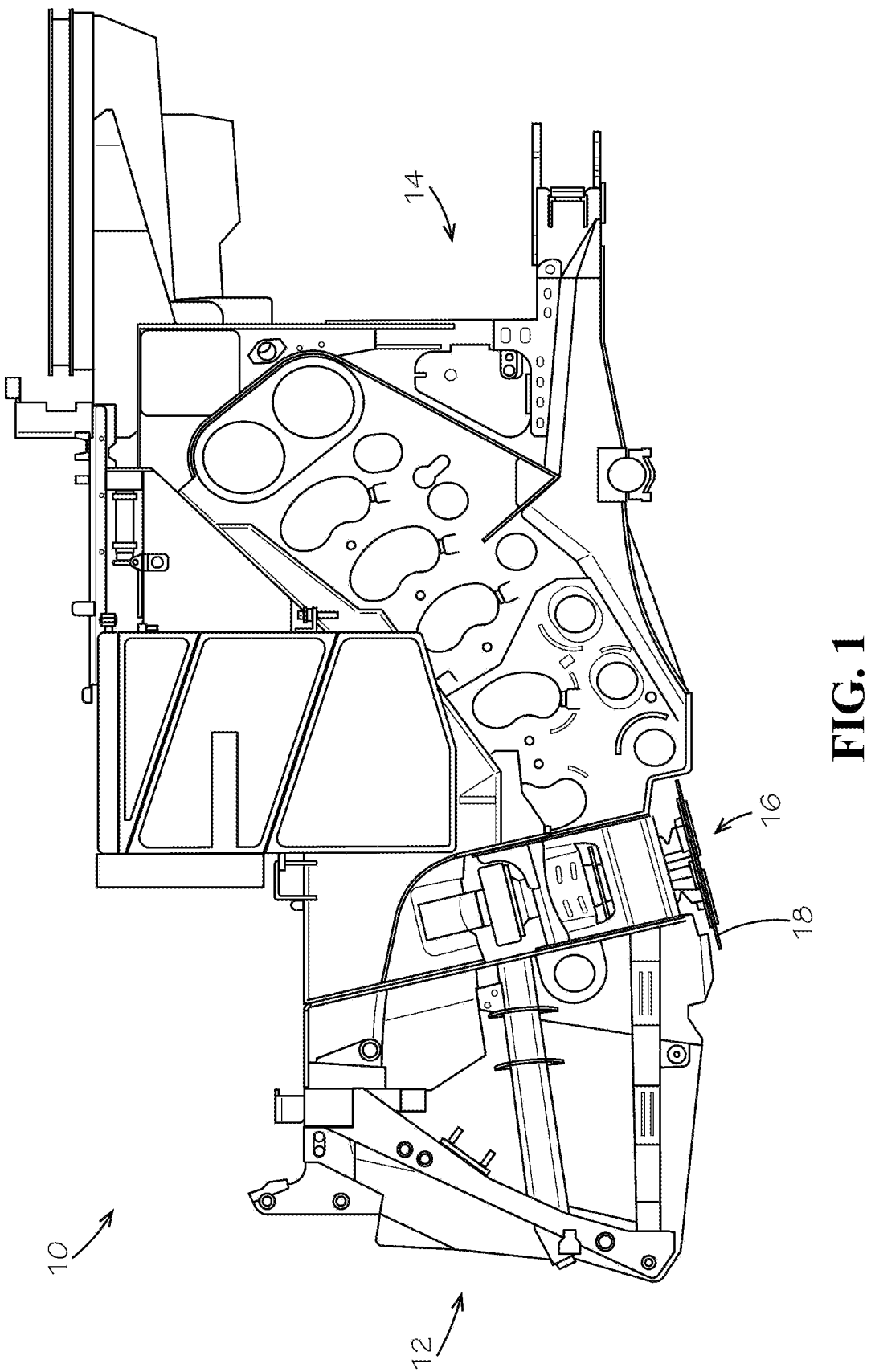
FIG. 1 is a schematic diagram that illustrates, in fragmentary, side elevation view, a sugarcane harvesting frame in which an embodiment of a base cutter system is deployed.

In one embodiment, a base cutter system, comprising: a first cutter shaft assembly; a second cutter shaft assembly; first and second brackets coupled to the first and second cutter shaft assemblies, respectively; first and second frame portions, the first cutter shaft assembly coupled to the first frame portion via the first bracket and the second cutter shaft assembly coupled to the second frame portion via the second bracket, the first and second cutter shaft assemblies adjustable between a laterally aligned arrangement and a laterally misaligned arrangement based on a relative adjustment of the first and second brackets.

DETAILED DESCRIPTION

Certain embodiments of a base cutter system and method for a sugarcane harvester are disclosed that enables arrangement of cutter shaft assemblies in a laterally aligned or misaligned arrangement. In one embodiment, the base cutter system comprises, for each cutter shaft assembly, an adjustable bracket that couples the cutter shaft assembly to a fixed portion of the sugarcane harvester frame. The adjustable bracket is moveable (e.g., manually, or via motive force) relative to the fixed frame portion, which enables fore-and-aft adjustment of the bracket relative to the fixed frame portion and thus fore-and-aft adjustment of each coupled cutter shaft assembly. For instance, adjustment of one of the cutter shaft assemblies more forwardly from an aligned arrangement and the opposing cutter shaft assembly adjusted more rearwardly (e.g., rotation about a central pivoting axis) from the aligned arrangement enables the misaligned arrangement of the cutter shaft assemblies, and vice versa. In the misaligned arrangement, the base cutter system may be equipped with serrated blades that provide full coverage without requiring a stacking of the blades along a centerline, reducing stalk and root damage for the sugarcane. Further, for applications where knived discs are preferred, the base cutter system cutter shaft assemblies (and hence knived discs) may be aligned.

Digressing briefly, existing base cutter systems use side-by-side (laterally-aligned) cutter shaft assemblies having knived discs, which provide for a partially overlapped cutting area between the two cutter shaft assemblies where the knived discs intermesh. In some applications, serrated blades may be desired, but at the cost of increased cutting area along the sugarcane stalk due to the required height overlap (plus any additional tolerances). The increased cutting area may damage the root system for subsequent harvests. In contrast, certain embodiments of a base cutter system enable the use of either serrated blades in a misaligned arrangement or knived discs for an aligned arrangement, where the misaligned arrangement enables the cutting of stalks with less loss when compared to conventional cutting techniques.

Having summarized certain features of a base cutter system, reference will now be made in detail to the description of a base cutter system as illustrated in the drawings. While an example base cutter system will be described in connection with these drawings, there is no intent to limit it to the embodiment or embodiments disclosed herein. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the sugarcane harvester looking forwardly.

FIG. 1 is a schematic diagram that illustrates, in fragmentary, side elevation view, a sugarcane harvesting frame 10 in which an embodiment of a base cutter system is deployed. The frame 10 is shown having a front portion 12 and a rear portion 14. Proximal to the front portion 12 is the base cutter system 16, wherein the observed half of the base cutter system 16 is shown with cutter blades 18 angled downward. In general, a sugarcane harvester comprises a top cutter and crop dividers coupled to the front portion 12 that first encounter the sugarcane. The top cutter cuts the leaves and the crop dividers separate the rows of sugarcane. Knock down rollers are used to prepare the crop to be cut, and push the sugarcane into a position where the blades 18 cut the sugar cane proximal to the ground surface (e.g., 1-2 inches from the soil surface). Feed rollers are then used to transport the cut sugarcane to a chopper. The chopper cuts the sugarcane into billets, which are passed in proximity to one or more extractors to remove straw and dirt before the cleaned billets are stored on-board and/or discharged to an accompanying truck or tractor-pulled trailer toward the rear portion 14.

The angle of inclination of the cutter blades 18 may be adjusted, as well as the height of the base cutter system 16. Additionally, as described further below, the cutter blades 18 may be arranged in a laterally aligned (as shown in FIG. 1) or laterally misaligned fashion (e.g., where one of the cutter blades is forwardly positioned relative to the other).

Figure 2A:
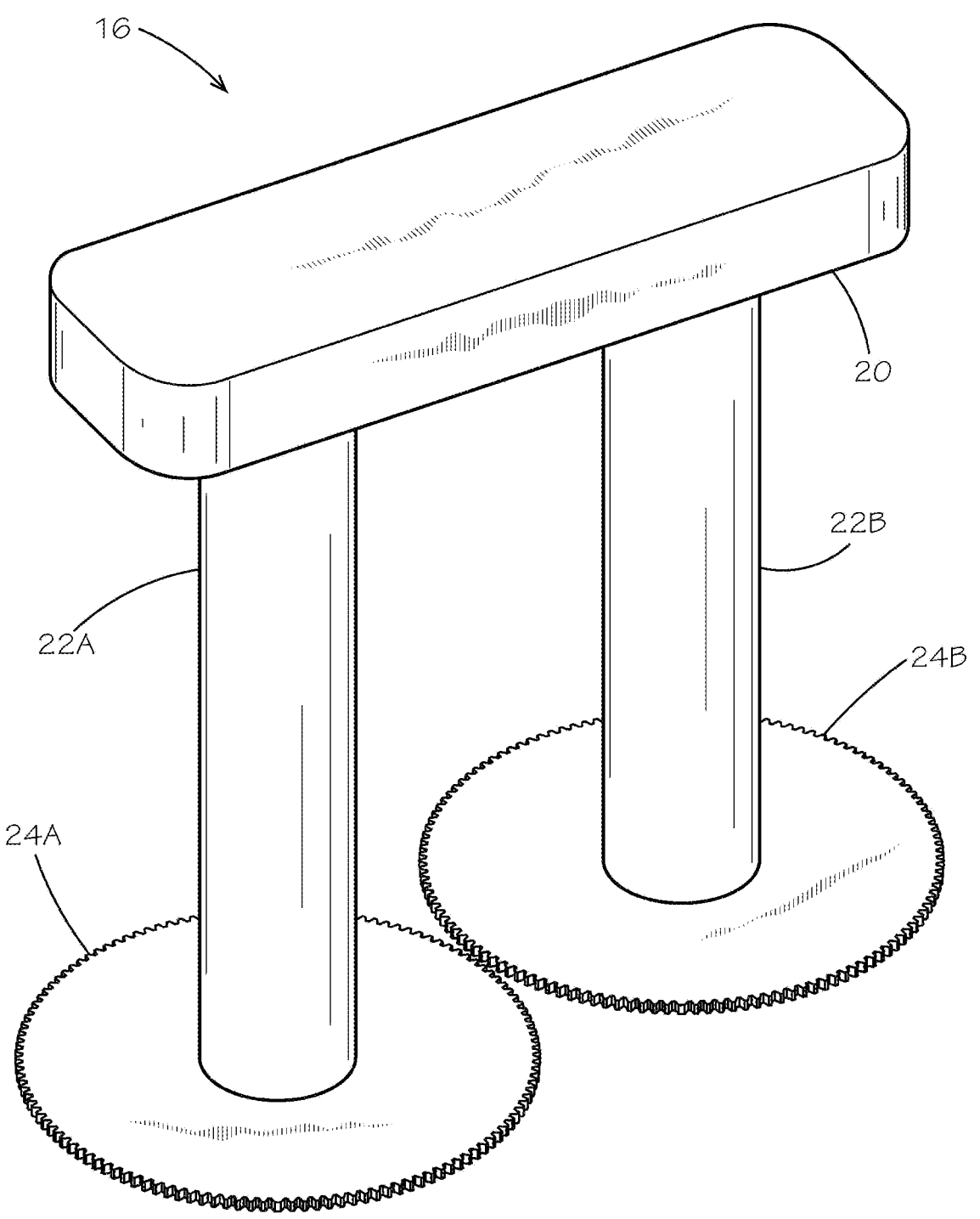
FIGS. 2A-2D are schematic diagrams that illustrate, in fragmentary view, a misaligned arrangement and different blade-types of certain embodiments of a base cutter system.
Figure 2B:
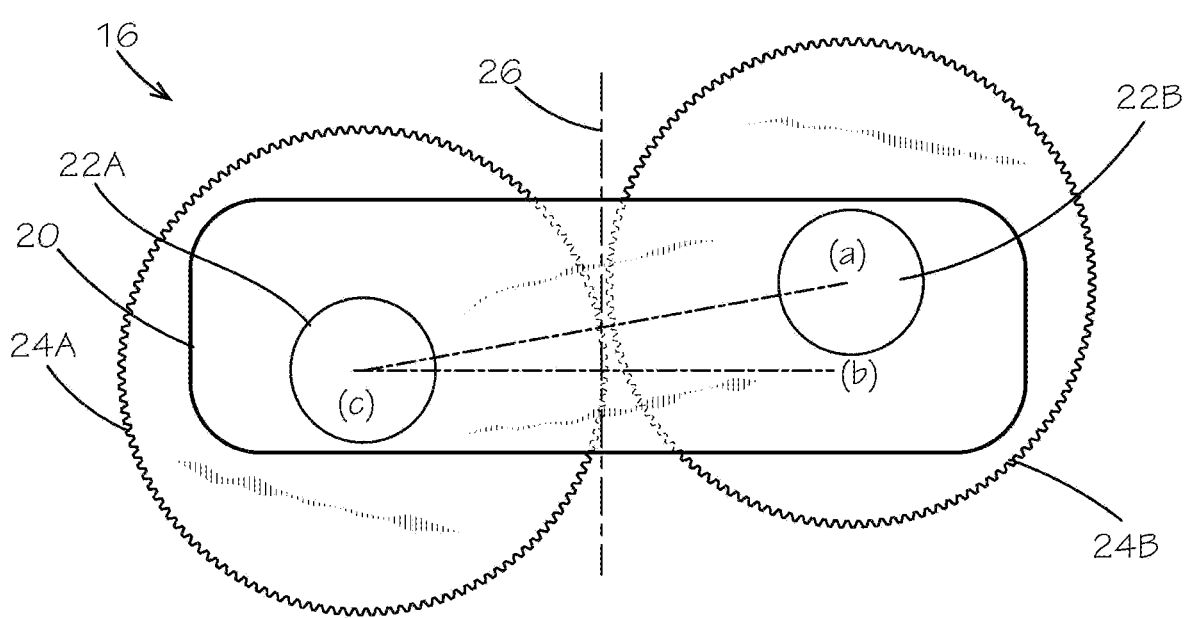
Figure 2C:
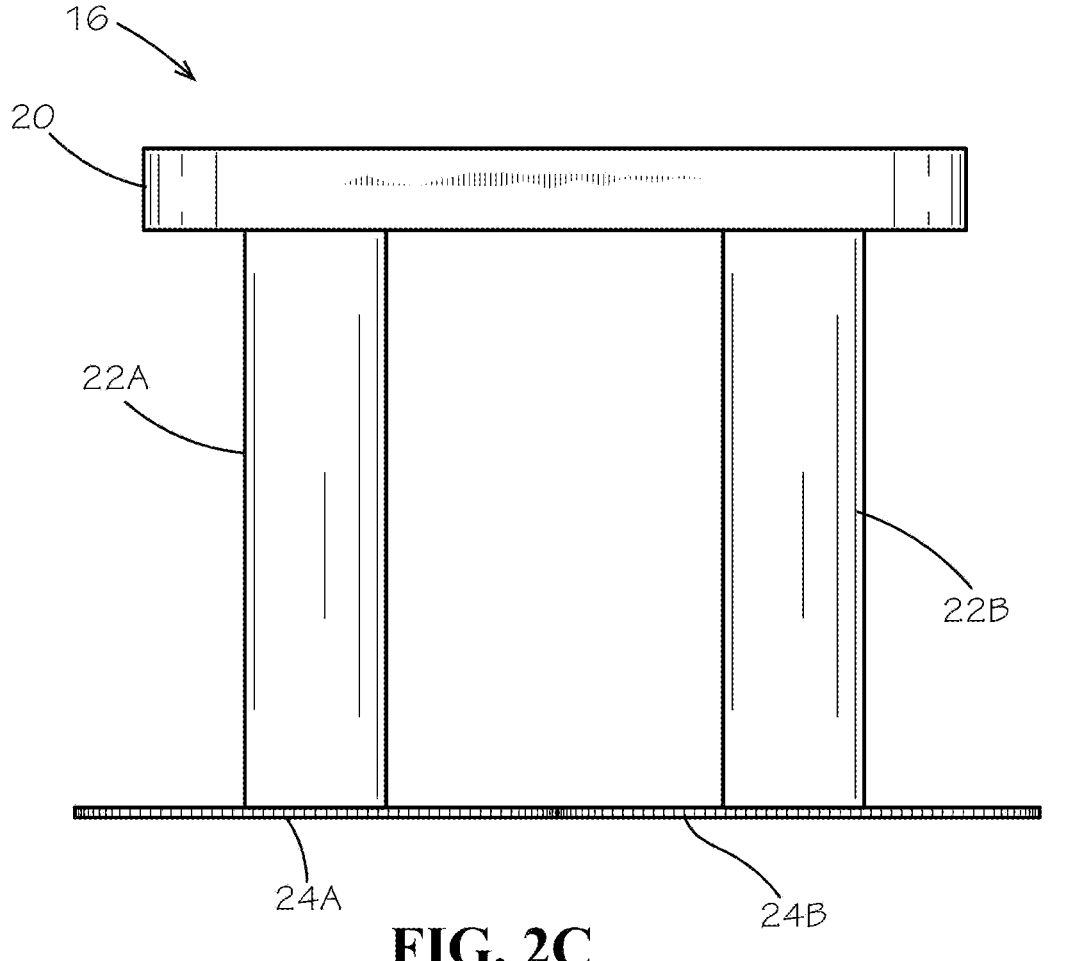
Figure 2D:
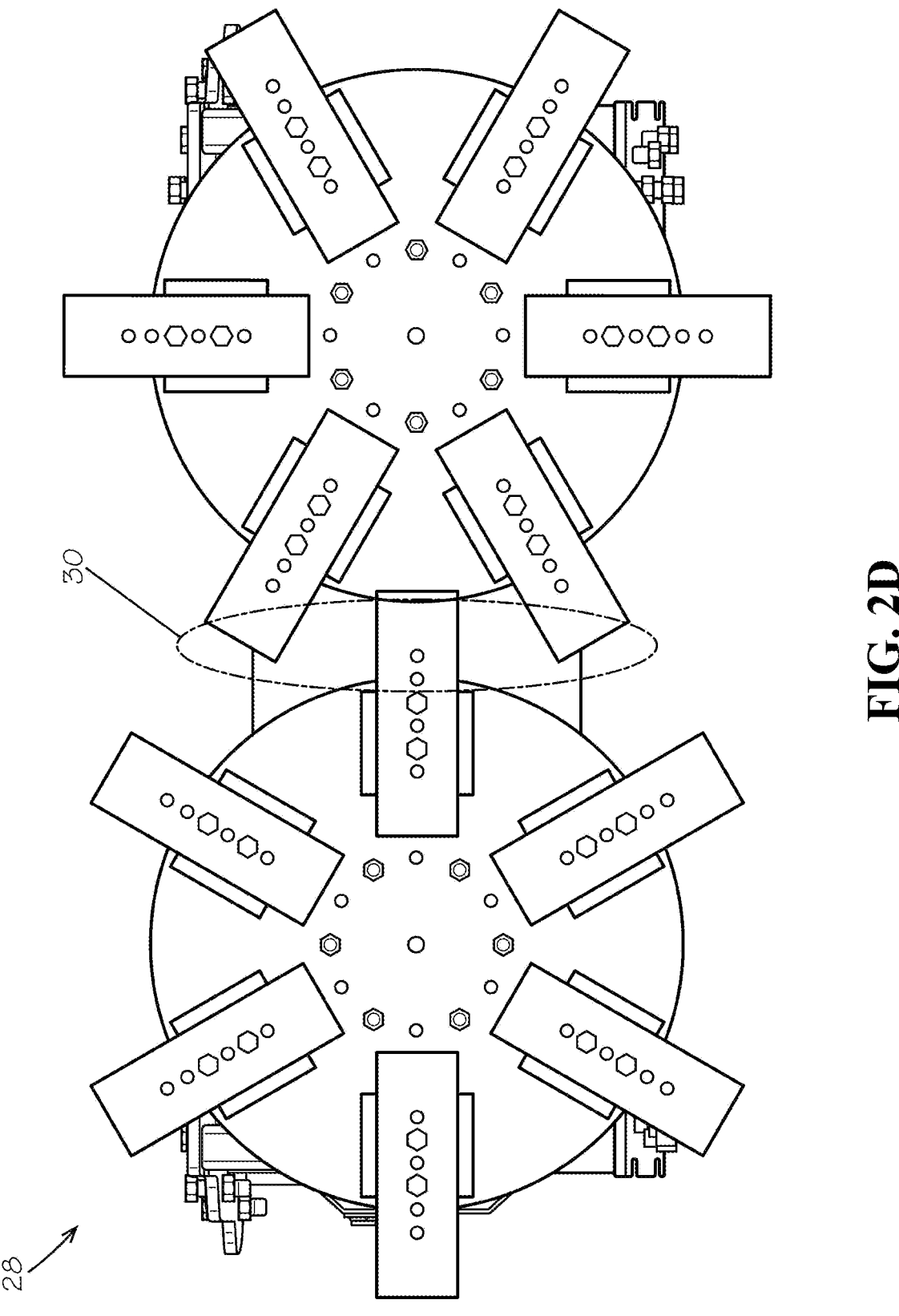

As to the misaligned arrangement, attention is directed to FIGS. 2A-2C, which show a misaligned arrangement of certain embodiments of the base cutter system 16. In FIGS. 2A-2C, the base cutter system 16 comprises, viewed from top-down, a gearbox assembly 20, cutter shaft assemblies 22 (e.g., 22A, 22B), and serrated cutter blades 24 (e.g., 24A, 24B, also referred to herein simply as serrated blades). The gearbox assembly 20 comprises gearing and motor(s) needed for causing rotation of the blades 24 via respective shafts housed in the cutter shaft assemblies 22A, 22B. As best represented in the top plan view of FIG. 2B, the cutter shaft assemblies 22 (and hence serrated blades 24) are shown in a misaligned arrangement. In other words, the cutter shaft assemblies 22 are offset in the fore-and-aft orientation, with one of the cutter shaft assemblies 22B more forwardly (assuming forward direction is at the top of FIG. 2B) than the other cutter shaft assembly 22A. Through this misaligned arrangement, the crop cutting area is fully covered since the outer periphery of the serrated blades 24A, 24B abut against a longitudinal center line or axis 26 running centrally between the first and second cutter shaft assemblies 22, as also shown in FIG. 2C (e.g., no gap). FIG. 2B also schematically demonstrates the ability of the base cutter system 16 to adjust between the misaligned and aligned arrangement. Specifically, points (a), (b), and (c) in FIG. 2B are used to reveal the different arrangements, with a line with end points (c) and (b) representing the laterally aligned (laterally side-by-side) arrangement of the cutter shaft assemblies 22, and a line with end points (c) and (a) representing the misaligned arrangement, where one of the cutter shaft assemblies 22B is more forward than the other cutter shaft assembly 22A. In some embodiments, the cutter shaft assembly 22A may be oriented more forwardly than cutter shaft assembly 22B, where the relative offset in the fore-and-aft position is generally an intended design goal. The misaligned arrangement enables the use of serrated blades 24 at the same elevation or height relative to, say, a level surface. In one embodiment, the serrated blades 24 are positioned approximately 1-2 inches from the soil surface to enable suitable capture of sugar content in the sugarcane stalk. Unlike conventional methods that layer or stack a portion of the blades (at the centerline) along a given elevation, resulting in approximately doubling the cutting area and increasing the risk of crop (e.g., root) damage for subsequent harvests, the fore-and-aft offset provides a benefit of not requiring an enlarged cutting area while reducing or preventing the loss of cutting area and preserving crop life/integrity. The ability to transition between misaligned and aligned arrangements also enables the use of a pair of knived discs 28 for the aligned arrangement, as shown in FIG. 2D. Specifically, the knived discs 28 are oriented in a laterally-aligned (side-by-side) arrangement, with overlap in a portion 30 of the cutting area by virtue of the intermeshing of the knives from each of the knived discs 28.

Figure 3A:
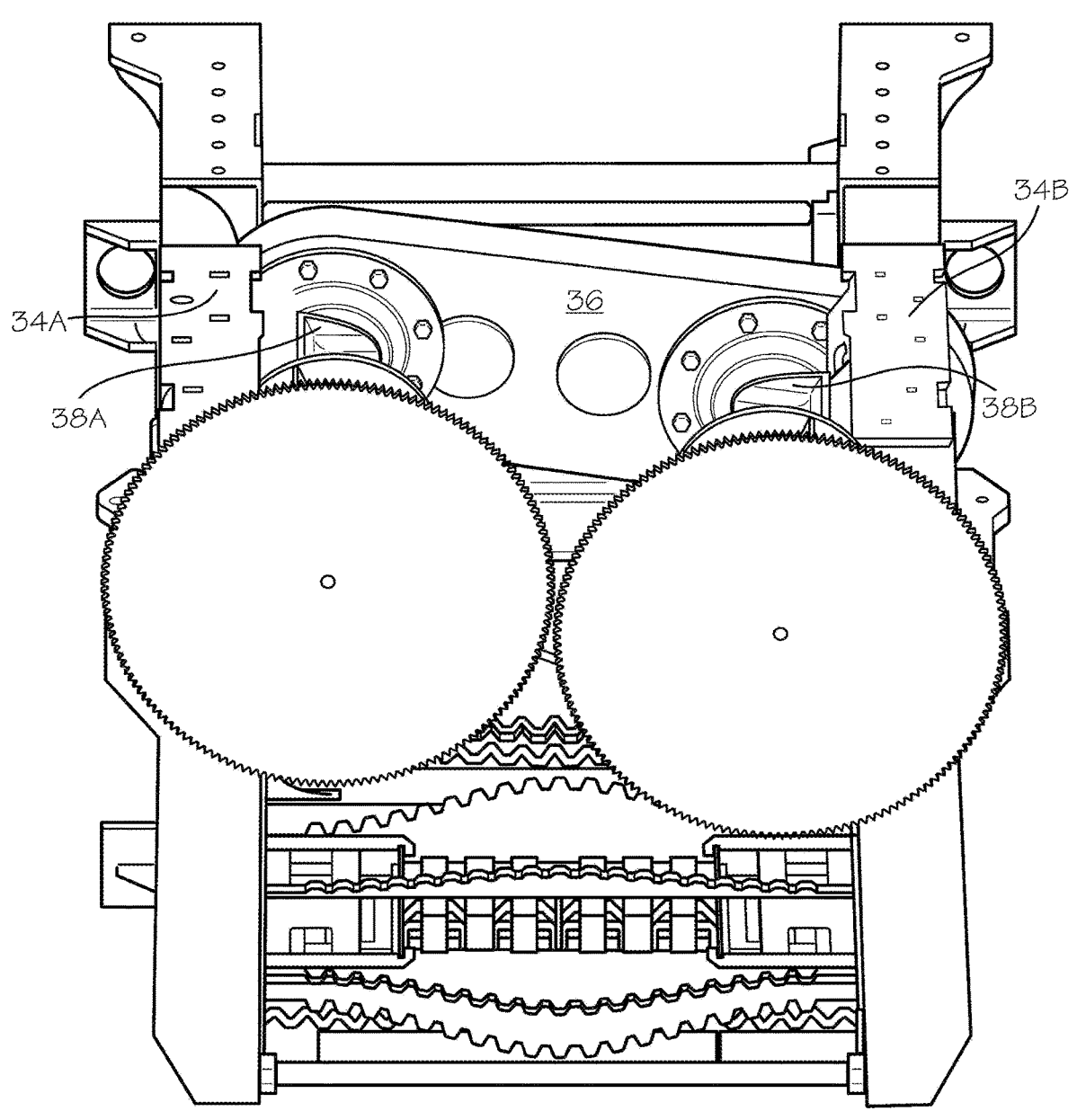
FIG. 3A is a schematic diagram that illustrates in lower front, isometric view, an embodiment of a base cutter system using serrated blades in a laterally misaligned arrangement.
Figure 3B:
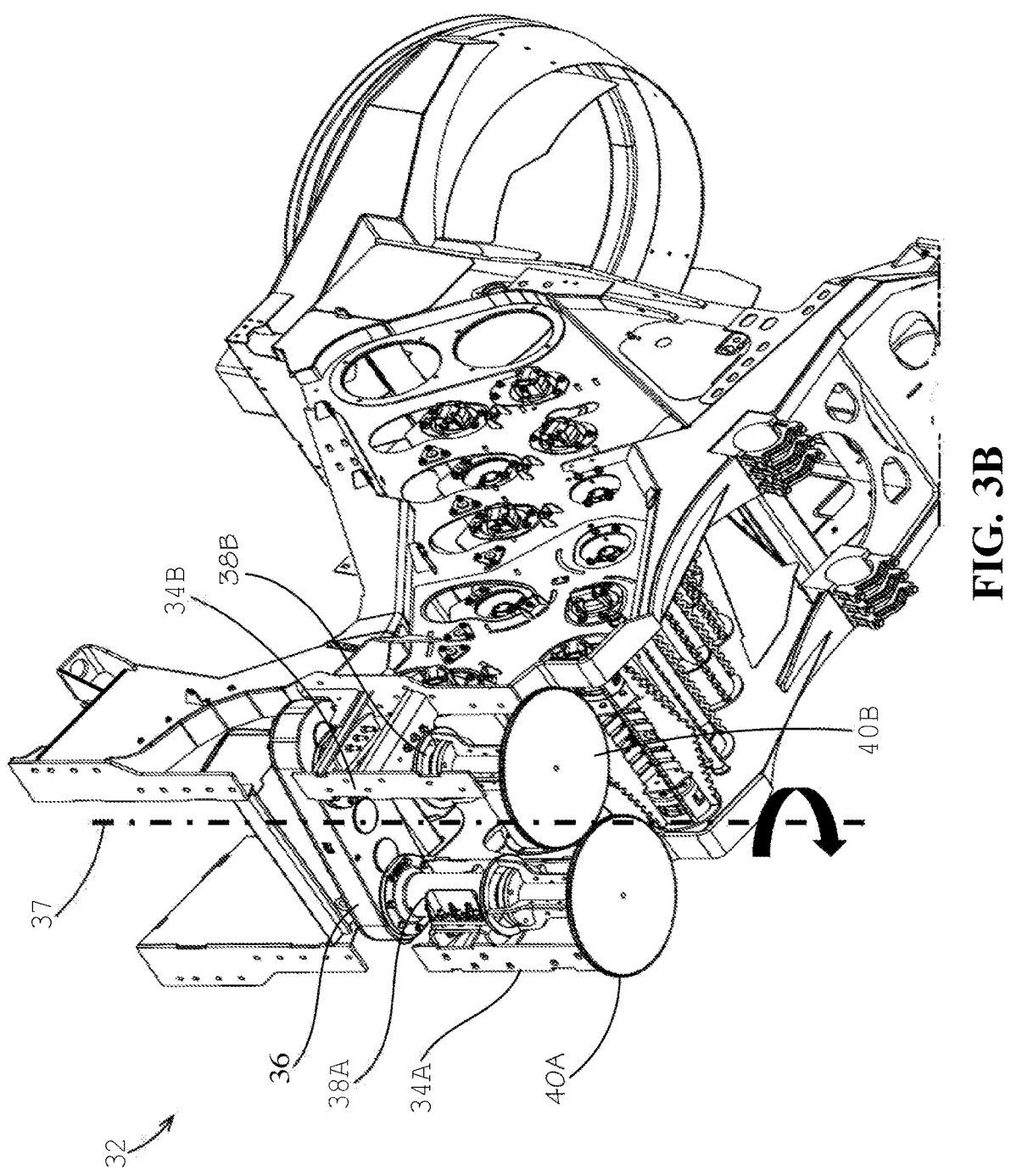
FIG. 3B is a schematic diagram that illustrates in lower, front-side isometric view, an embodiment of a base cutter system and a rotational axis about which the base cutter system is rotated between misaligned and aligned arrangements.
Figure 3C:
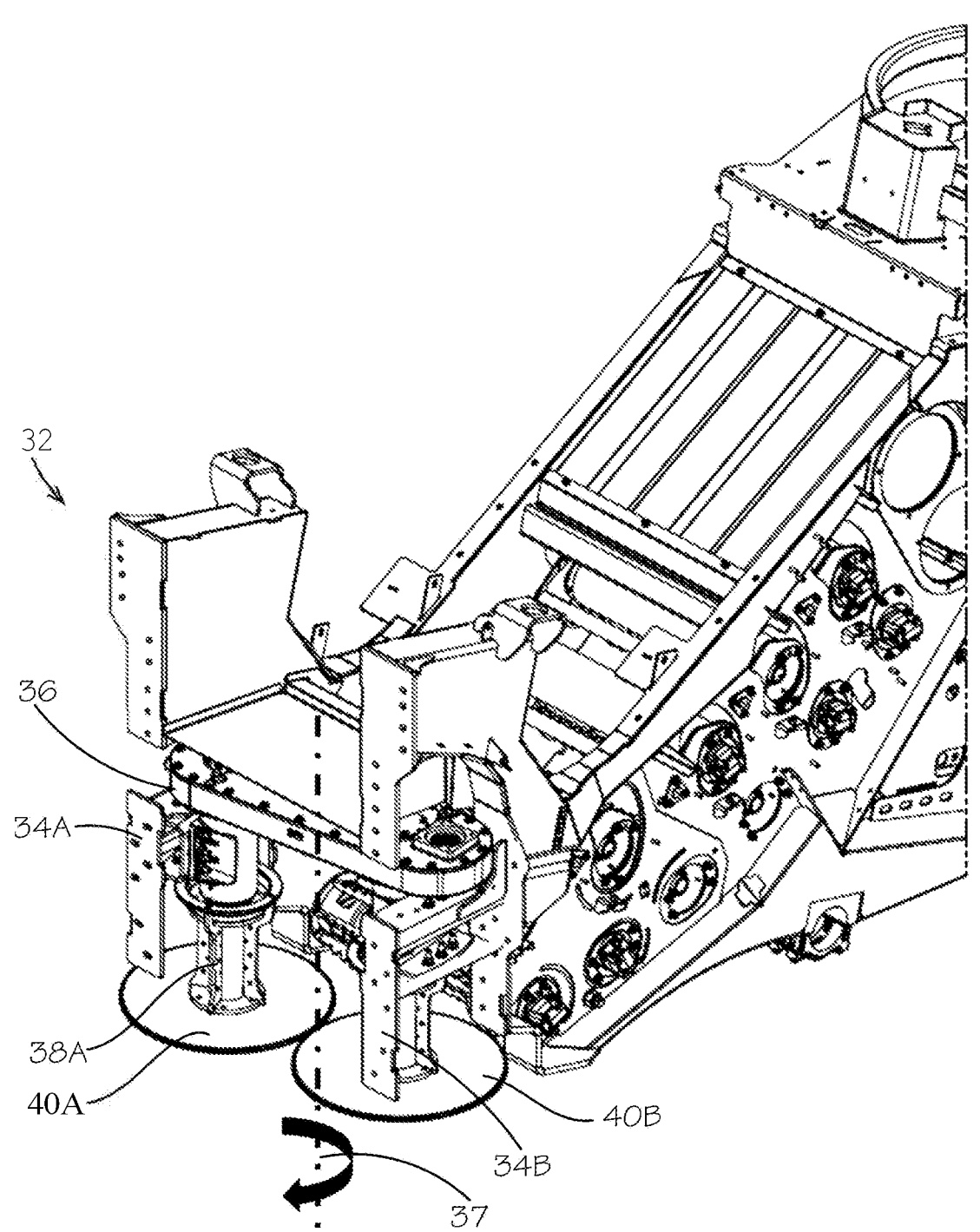
FIG. 3C is a schematic diagram that illustrates in upper, front-side isometric view, an embodiment of a base cutter system and a rotational axis about which the base cutter system is rotated between misaligned and aligned arrangements.

Referring now to FIG. 3A, shown is an embodiment of a base cutter system 32 that is depicted in bottom isometric view. The base cutter system 32 comprises a fixed frame 34, gearbox assembly 36, a pair of cutter shaft assemblies 38, and a pair of serrated blades 40. The description of these components 32, 34, 36, and 38 are similar to that described above for like-named components, including the base cutter system 16, gearbox assembly 20, cutter shaft assembly 22, and serrated blades 24, and hence discussion of the same is omitted here for brevity except as noted below. The base cutter system 32 is depicted in a misaligned arrangement, as noted by the manner in which the cutter shaft assemblies 38A, 38B are rotated about a central axis of rotation 37 of the gearbox assembly 36, as shown in FIGS. 3B-3C. The relative offset in the fore-and-aft direction may be as depicted here with the cutter shaft assembly 38A (and hence serrated blade 40A) forward of the cutter shaft assembly 38B (and hence serrated blade 40B), or in some embodiments, reversed. In one embodiment, the transition between misaligned and aligned arrangements is enabled through the use of a respective moveable (in the fore-and-aft direction) bracket located on each outer side of the cutter shaft assemblies 38, as shown in FIGS. 4-6B.

Figure 4:
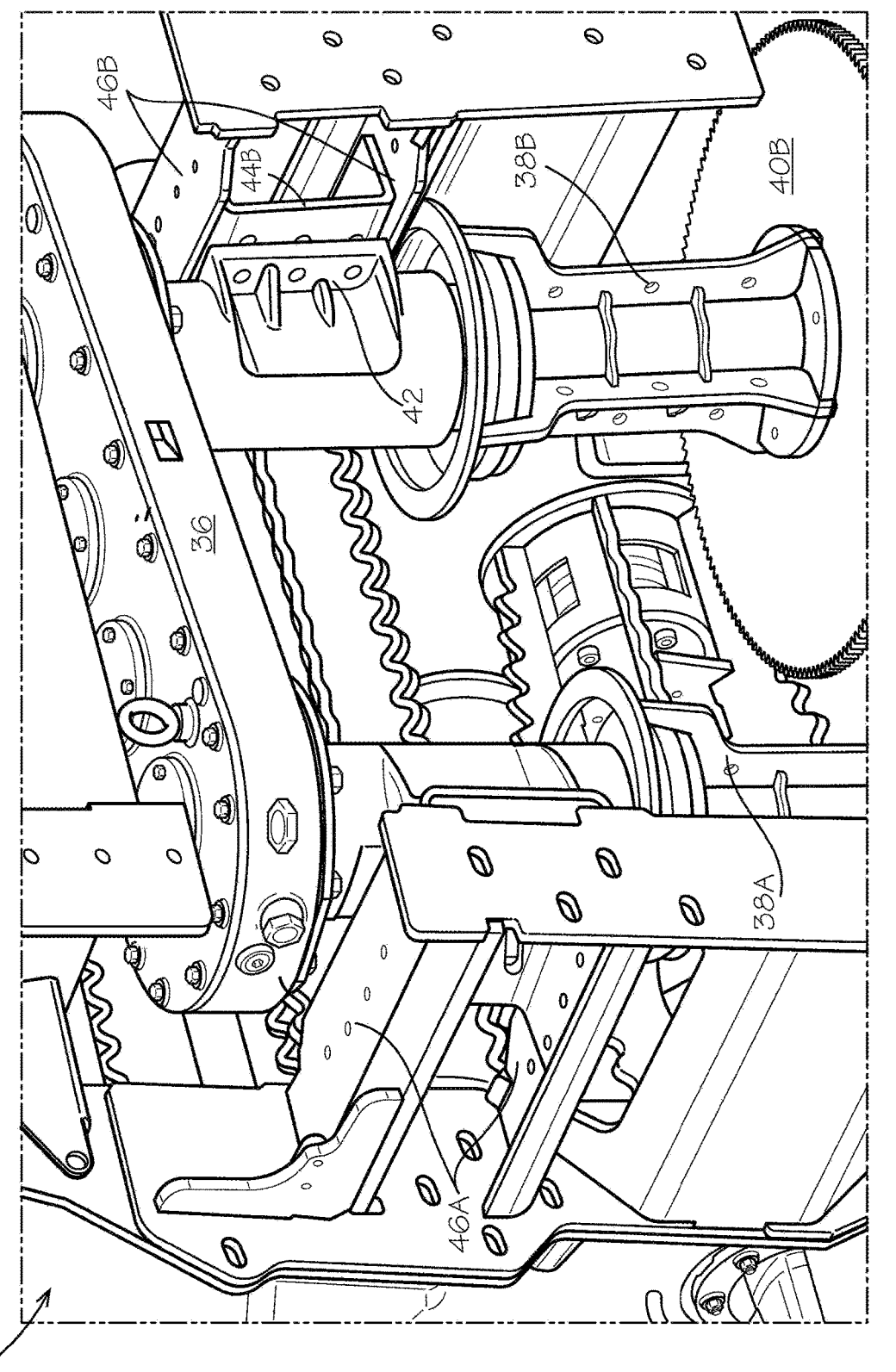
FIG. 4 is a schematic diagram that illustrates in fragmentary, front-side isometric view an embodiment of the base cutter system with adjustable brackets that may be used to enable a transition between laterally misaligned and aligned arrangements.

In the description that follows, emphasis is placed on describing one side of the base cutter system 32 (except as noted below), with similar applicability for the other side except as noted below. Referring to FIGS. 3A-4, the base cutter system 32 comprises the gearbox assembly 36, cutter shaft assemblies 38 (e.g., 38A, 38B) having shafts disposed within and operably coupled to the gearbox assembly 36, and serrated blades 40 operably coupled to the shafts of the cutter shaft assemblies 38. Referring in particular to cutter shaft assembly 38B and FIG. 4, the cutter shaft assembly 38B comprises a coupling bracket 42 located at a laterally-outward facing side of the cutter shaft assembly 38B. The coupling bracket 42 is adjacent and coupled to an adjustable bracket 44B (and similarly, a coupling bracket, obscured from view, coupled to adjustable bracket 44A), the adjustable bracket 44B (like 44A) adjustably coupled above and below (e.g., via bolts, screws, etc.) to a fixed frame portion 46B. That is, through removal of screws or bolts disposed in the coincident through-holes of the adjustable bracket 44B and fixed frame portion 46B, the adjustable bracket 44B may be moved fore-and-aft as desired to enable a transition between misaligned and aligned arrangements. In some embodiments, the adjustable bracket 44B may only be adjustably coupled via screws or bolts through either the top or bottom to the fixed frame portion 46B.

Figures 5A, 5B:
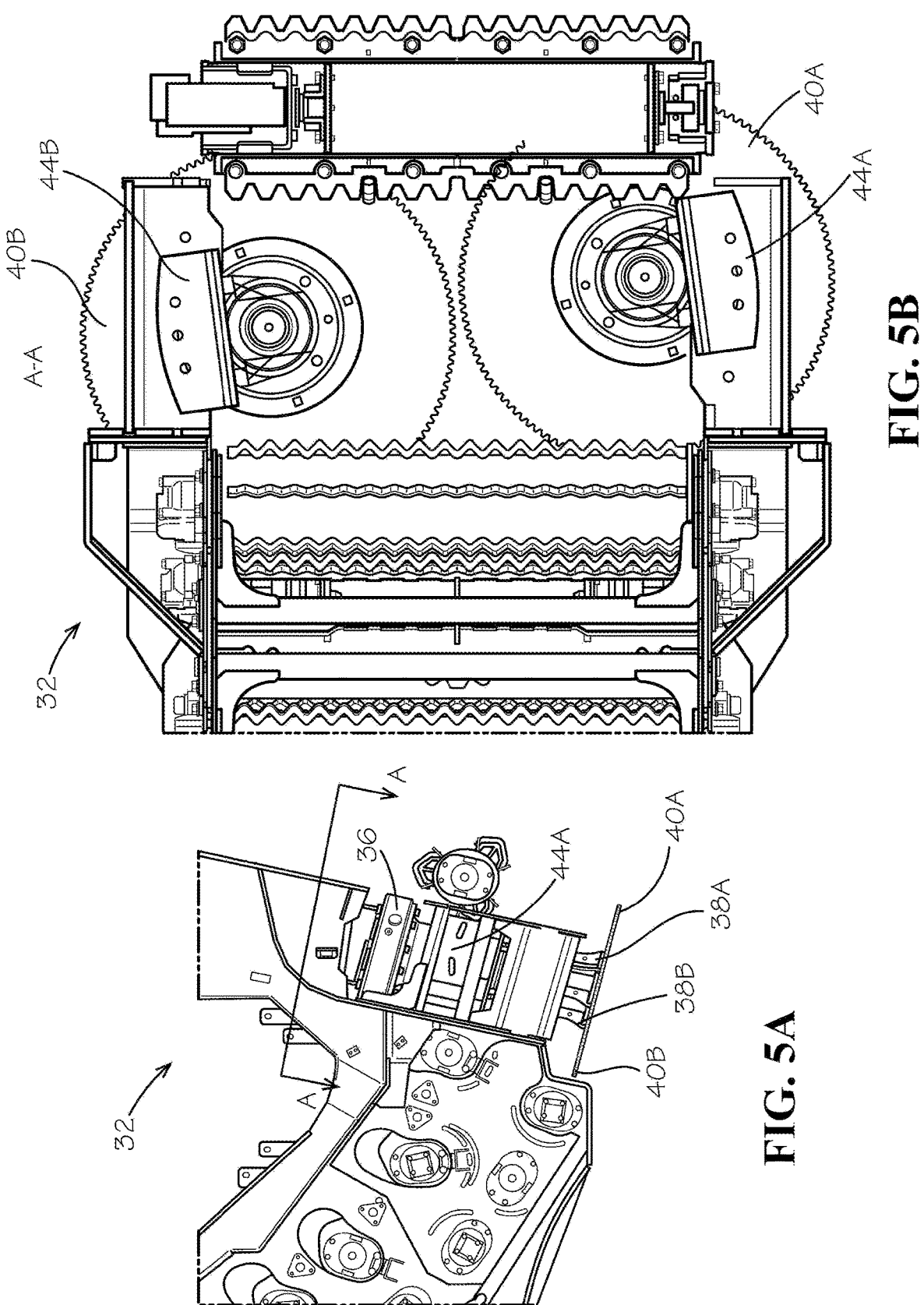
FIG. 5A is a schematic diagram that illustrates in fragmentary, side elevation view, an embodiment of a base cutter system.
FIG. 5B is a schematic diagram that illustrates in fragmentary, overhead plan view a section from FIG. 5A that illustrates the manner in which adjustment of brackets is used to enable rotation between misaligned and aligned arrangements.

FIGS. 5A-5B further illustrates the brackets 44 and their fore-and-aft position when in the misaligned arrangement. With particular reference to FIG. 5B (shown in an overhead, fragmentary section A-A through the base cutter system 32 in FIG. 5A), and with continued reference to FIGS. 3A-4, in one example operation to transition from an aligned arrangement to a misaligned arrangement, the adjustable bracket 44A coupling the cutter shaft assembly 38A to the fixed frame portion 46 is moved forwardly (e.g., release the bolts from the coincident through-holes and move forward and then re-secure), and the adjustable bracket 44B for the cutter shaft assembly 38B on the opposing side is moved rearwardly using a similar adjustment method. In some embodiments, only one of the adjustable brackets 44 is adjusted to enable the fore-and-aft offset. As described above, the fore-and-aft arrangement of the adjustable brackets 44 (and hence cutter shaft assemblies 38) may be reversed from that described above, in some embodiments.

Note that in some embodiments, adjustments may be performed under an operator-initiated (e.g., via user interface) motive force (e.g., electrical, magnetic, hydraulic, pneumatic, etc.), such as under control of a control system and/or controller via operator activation (e.g., from a user interface in a cab of the sugarcane harvester or via remote control). For instance, the connection between the adjustable bracket 44 and the fixed frame portion 46 may be achieved via a releasable locking mechanism (e.g., using a mechanical latch coupled to a motive force, including through the use of an actuator comprising an electromagnetic solenoid, hydraulic or pneumatic actuator, motor, etc.), somewhat similar to remote door locking mechanisms used in some of today's smart homes. Note that the specific bolt quantities or arrangements for the adjustable bracket 44 and/or its coupling to the coupling bracket 42 or fixed frame portion 46 depicted in FIGS. 4-5B may be varied in some embodiments. Further, though shows as a somewhat U-shaped configuration, the adjustable bracket 44 may be of another geometric configuration in some embodiments (e.g., L shaped, etc.).

Figure 6A:
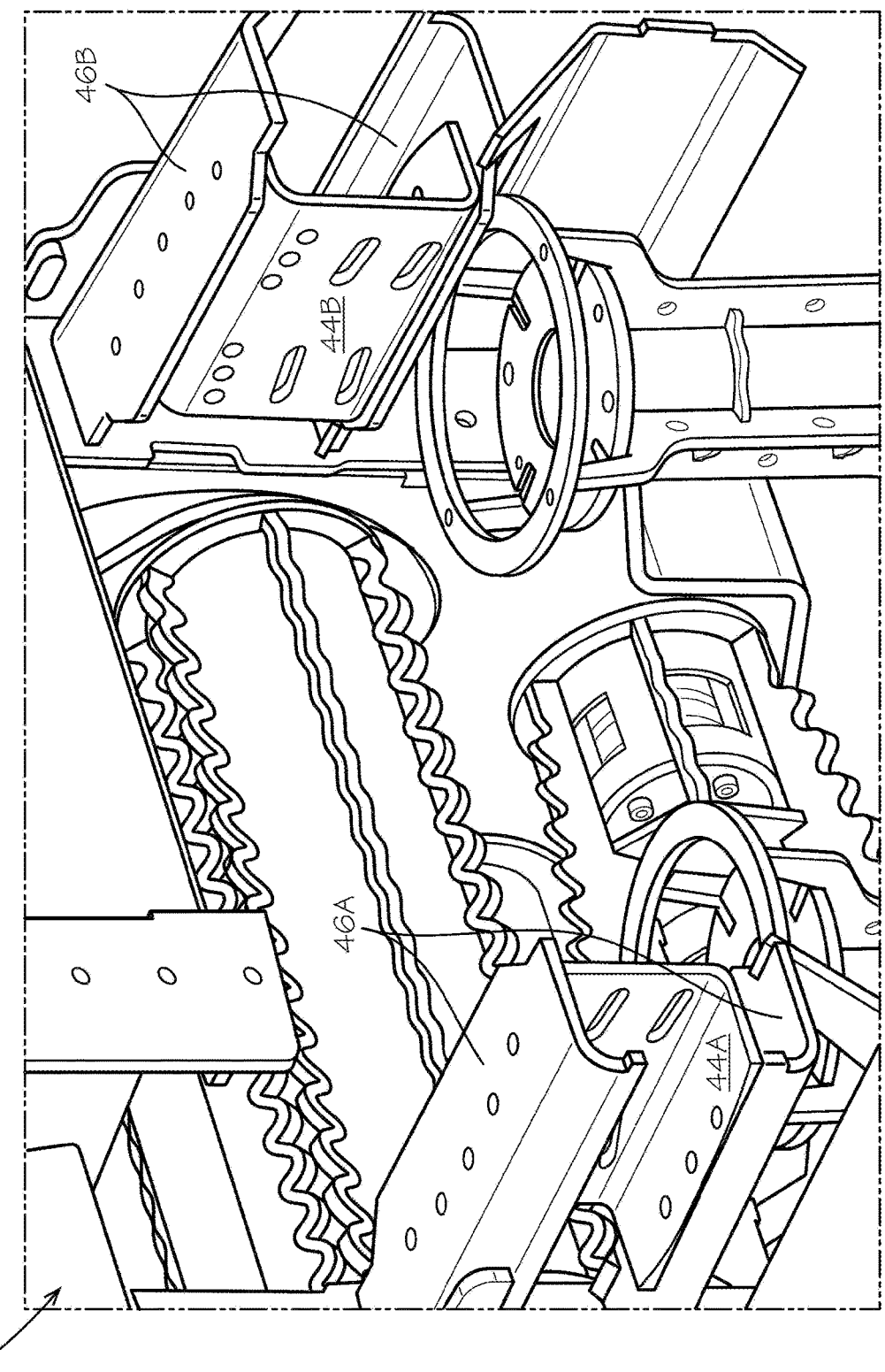
FIG. 6A is a schematic diagram that illustrates in fragmentary, front-side isometric view an embodiment of the base cutter system with adjustable brackets that may be used to enable a transition between laterally misaligned and aligned arrangements.
Figure 6B:
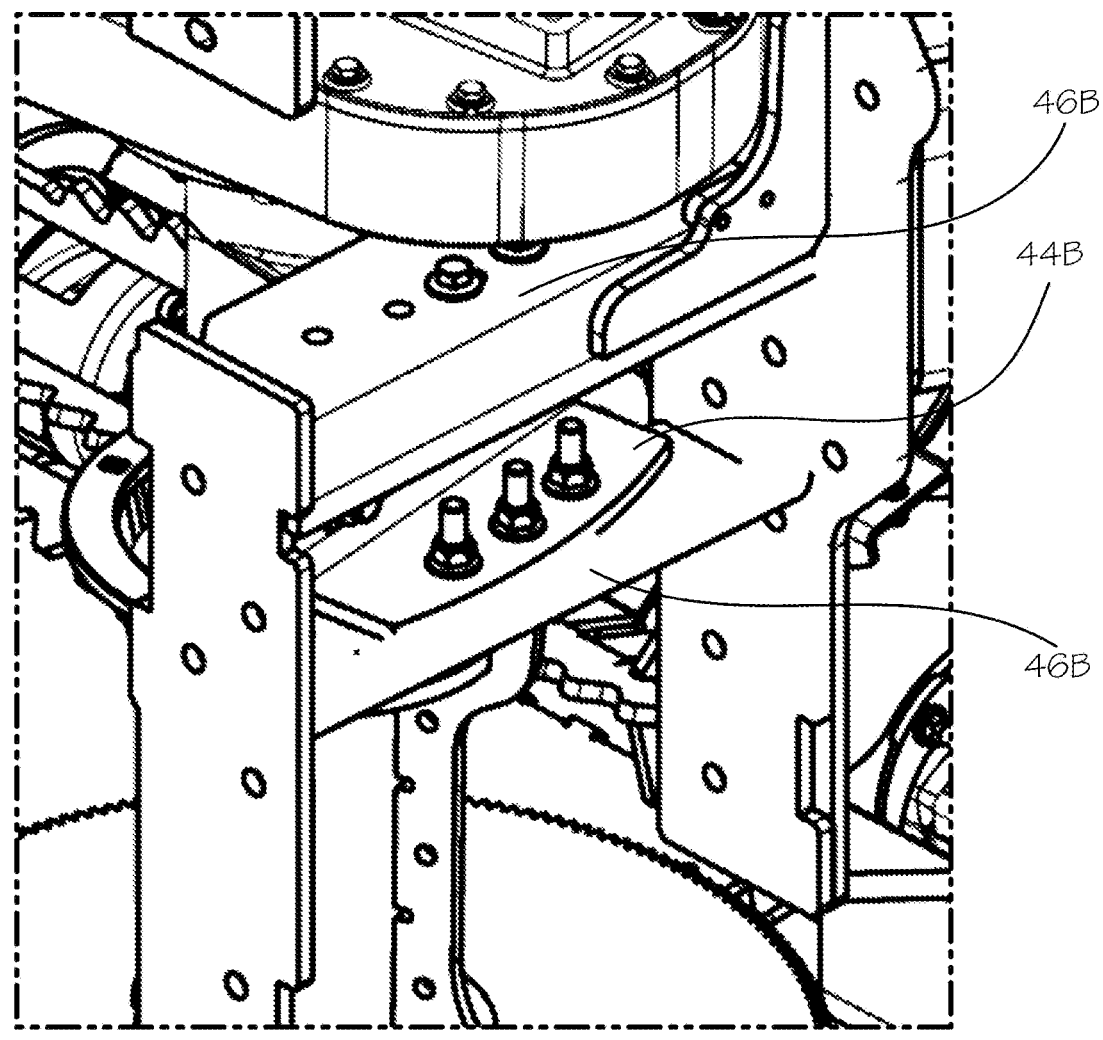
FIG. 6B is a schematic diagram that illustrates an example adjustment mechanism used for the brackets shown in FIG. 6A.

FIG. 6A shows another view of the adjustable bracket 44 (e.g., 44A, 44B), yet with the coupling bracket 42, gearbox assembly 36, and portion of the cutter shaft assembly 38B omitted from view. As shown in FIGS. 5B-6A, the adjustable bracket 44B is adjustably coupled at the top and bottom to the fixed frame portion 46B. In particular, and as also shown in FIG. 6B, the adjustable bracket 44B may be releasably (e.g., withdraw bolts or screws and slid over) moved in fore-and-aft direction relative to the fixed frame portion 46B, enabling a transition between misaligned and aligned arrangements for the base cutter system 32. Similar relative operation applies for the adjustable bracket 44A and fixed frame portion 46A on the opposing side.

Figures 7, 8:
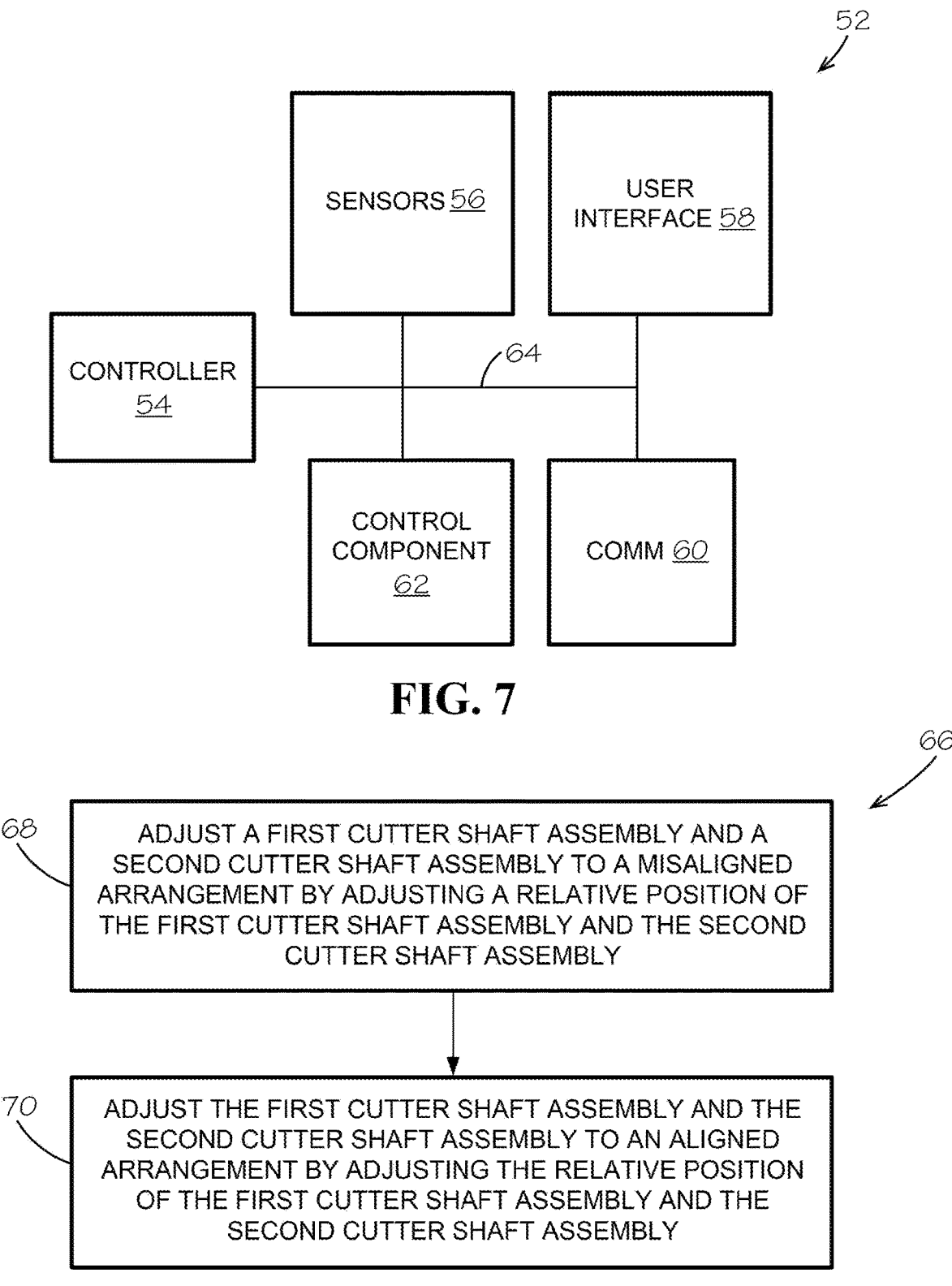
FIG. 7 is a block diagram that illustrates an embodiment of an example control system.
FIG. 8 is a flow diagram that illustrates an embodiment of an example base cutter method.

Having described some example embodiments of a cutter base system, reference is made to FIG. 7, which shows an embodiment of an example control system 52 that may be implemented in a sugarcane harvester. It should be appreciated within the context of the present disclosure that some embodiments may include additional components or fewer or different components, and that the example depicted in FIG. 7 is merely illustrative of one embodiment among others. The control system 52 comprises a controller 54. Though described below as residing in the sugarcane harvester (e.g., in the cab), in some embodiments, functionality of the controller 54 may reside entirely, or at least partly, at a remote computing device, such as a server that is coupled to the control system components over one or more wireless networks (e.g., in wireless communication with the sugarcane harvester via a radio frequency (RF) and/or cellular modems residing in the sugarcane harvester or enabled using an operator's smart phone). Further, though depicted using a single controller 54, in some embodiments, the control system 52 may be comprised of plural controllers having a top-down or peer-to-peer control scheme. In the depicted embodiment, the controller 54 is coupled to and/or in communication with sensors 56, a user interface (UI) 58, a communications interface 60, and control components 62 via one or more networks, such as network 64 (e.g., a CAN network or other network, such as a network in conformance to the ISO 11783 standard, also referred to as "Isobus"). Note that control system operations are primarily disclosed herein in the context of control via the single controller 54, with the understanding that additional controllers may be involved in one or more of the disclosed functionality in some embodiments.

The sensors 56 include the sensors used to sense machine functions and/or crop conditions and may include one or any combination of contact (e.g., electromechanical sensors, such as position sensors, strain gauges, pressure sensors, distance measurement, etc.) and non-contact type sensors (e.g., photo-electric, inductive, capacitive, ultrasonic, etc.), all of which comprise known technology. Additional sensors 56 may include navigational sensing, including a global navigation satellite system (GNSS) receiver and/or inertial components, including gyroscopes, accelerometers, etc.

The user interface 58 may include one or more components, including one or any combination of a keyboard, mouse, microphone, touch-type or non-touch-type display device (e.g., display monitor or screen), joystick, steering wheel, FNR lever, and/or other devices (e.g., switches, immersive head set, etc.) that enable input and/or output by an operator. For instance, in some embodiments, the user interface 58 may be used to present graphical representation or real time images of certain functions, including the visual representation of the base cutter system for visualizing adjustment of the cutter angle of inclination, cutter height adjustment, and/or cutter alignment/misalignment adjustment.

The communications interface 60 comprises a wireless network interface module (e.g., including an RF or cellular modem) for wireless communication among other devices of the sugarcane harvester or other communication devices located remote and/or external from the sugarcane harvester. The communications module may work in conjunction with communication software (e.g., including browser software) in the controller 54, or as part of another controller coupled to the network 64 and dedicated as a gateway for wireless communications to and from the network 64. The communications module may comprise MAC and PHY components (e.g., radio circuitry, including transceivers, antennas, etc.), as should be appreciated by one having ordinary skill in the art.

The control components 62 comprise components used to control operations of the sugarcane harvester and its associated systems. The control component 62 may regulate fluid (e.g., hydraulic fluid) flow to the base cutter system, including for the various adjustments described above. In some embodiments, other motive forces/mechanisms for control may be used, including control based on electric or electro-magnetic or magnetic devices, pneumatic control, or solar control. The control component 62 may comprise one or more of a variety of actuators, including control valves, motors/motor control logic, air valves, solenoids, among other controlling devices or components.

The controller 54 may be configured as one or more electronic control units (ECUs) or other computing device (s), including a programmable logic controller (PLC), field programmable gate array (FPGA), application specific integrated circuit (ASIC), among other devices.

Having described certain embodiments of a base cutter system, it should be appreciated by one having ordinary skill in the art in the context of the present disclosure that one embodiment of an example base cutter adjustment method, denoted in FIG. 8 as method 66, comprises adjusting a first cutter shaft assembly and a second cutter shaft assembly to a misaligned arrangement by adjusting a relative position of the first cutter shaft assembly and the second cutter shaft assembly (68); and adjusting the first cutter shaft assembly and the second cutter shaft assembly to an aligned arrangement by adjusting the relative position of the first cutter shaft assembly and the second cutter shaft assembly (70).

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

The invention claimed is:

1. A base cutter system of a sugarcane harvester, comprising:
   a first cutter shaft assembly;
   a second cutter shaft assembly;
   first and second brackets coupled to the first and second cutter shaft assemblies, respectively; and
   first and second frame portions, the first cutter shaft assembly coupled to the first frame portion via the first bracket and the second cutter shaft assembly coupled to the second frame portion via the second bracket, the first and second cutter shaft assemblies adjustable between a laterally aligned arrangement and a laterally misaligned arrangement based on a relative adjustment of the first and second brackets,
   wherein in the laterally misaligned arrangement, one of the first cutter shaft assembly and the second cutter shaft assembly is more forwardly positioned than the other relative to a front of the sugarcane harvester.

2. The base cutter system of claim 1, wherein in the laterally misaligned arrangement, the first and second cutter shaft assemblies each comprises serrated blades.

3. The base cutter system of claim 2, wherein a bottom surface of the serrated blades are at substantially equal heights relative to a level ground surface.

4. The base cutter system of claim 2, wherein an outside periphery of each of the serrated blades abut against a longitudinal center line running centrally between the first and second cutter shaft assemblies.

5. The base cutter system of claim 1, wherein in the laterally aligned arrangement, the first and second cutter shaft assemblies each comprises knived discs.

6. The base cutter system of claim 5, wherein at least a portion of the knived discs of each of the first and second cutter shaft assemblies overlap an area.

7. The base cutter system of claim 5, wherein the first and second cutter shaft assemblies are side-by-side relative to a longitudinal center line running centrally between the first and second cutter shaft assemblies.

8. The base cutter system of claim 1, wherein the adjustment is performed manually.

9. The base cutter system of claim 1, wherein the adjustment is performed via one or more actuators under a motive force.

10. The base cutter system of claim 1, further comprising a gearbox assembly, the gearbox assembly operably coupled to shafts of the first and second cutter shaft assemblies.

11. A base cutter system of a sugarcane harvester, comprising:

a first cutter shaft assembly comprising a first serrated blade; and a second cutter shaft assembly comprising a second serrated blade, the first and second cutter shaft assemblies arranged in a laterally misaligned arrangement where an outside periphery of each of the first and second serrated blades abut against a longitudinal center line running centrally between the first and second cutter shaft assemblies and one of the first or second cutter shaft assemblies is positioned more forwardly than the other of the first or second cutter shaft assemblies relative to a front of the sugarcane harvester.

12. The base cutter system of claim 11, further comprising:

first and second brackets coupled to the first and second cutter shaft assemblies, respectively; and first and second frame portions, the first cutter shaft assembly coupled to the first frame portion via the first bracket and the second cutter shaft assembly coupled to the second frame portion via the second bracket, the first and second cutter shaft assemblies adjustable between a laterally aligned arrangement and the laterally misaligned arrangement based on a relative adjustment of the first and second brackets.

13. The base cutter system of claim 12, wherein the adjustment is performed manually.

14. The base cutter system of claim 12, wherein the adjustment is performed via one or more actuators under a motive force.

15. The base cutter system of claim 11, wherein a bottom surface of the first and second serrated blades are at substantially equal heights relative to a level ground surface.

16. The base cutter system of claim 11, wherein when transitioned to a laterally aligned arrangement, the first and second cutter shaft assemblies each comprises knived discs.

17. The base cutter system of claim 16, wherein at least a portion of the knived discs of each of the first and second cutter assemblies overlap an area.

18. The base cutter system of claim 16, wherein first and second cutter shaft assemblies are side-by-side relative to a longitudinal center line running centrally between the first and second cutter shaft assemblies.

19. A base cutter adjustment method for a sugarcane harvester, comprising:

adjusting a first cutter shaft assembly and a second cutter shaft assembly to a misaligned arrangement by adjusting a relative position of the first cutter shaft assembly and the second cutter shaft assembly, wherein in the misaligned arrangement one of the first cutter shaft assembly or the second cutter shaft assembly is more forwardly positioned than the other relative to a front of the sugarcane harvester; and adjusting the first cutter shaft assembly and the second cutter shaft assembly to an aligned arrangement by adjusting the relative position of the first cutter shaft assembly and the second cutter shaft assembly.

* * * * *